United States Patent [19]

Rostoker

[11] Patent Number: 4,894,199

[45] Date of Patent: Jan. 16, 1990

[54] BEAM FUSION DEVICE AND METHOD

[76] Inventor: Norman Rostoker, 18 Aspen Tree La., Irvine, Calif. 92715

[21] Appl. No.: 51,899

[22] Filed: Jun. 11, 1987

Related U.S. Application Data

[63] Continuation-in-part of Ser. No. 872,888, Jun. 11, 1986, abandoned.

[51] Int. Cl.⁴ .............................................. G21B 1/00
[52] U.S. Cl. .................................... 376/107; 376/128; 376/130; 376/133; 376/137; 376/143; 376/139
[58] Field of Search ............... 376/107, 139, 140, 128, 376/130, 143, 133, 137

[56] References Cited

U.S. PATENT DOCUMENTS

| | | | |
|---|---|---|---|
| 3,026,447 | 3/1962 | Kerst | 376/139 |
| 3,132,996 | 5/1964 | Baker et al. | 376/107 |
| 3,624,443 | 11/1971 | Hammel | 376/107 |
| 4,057,462 | 11/1977 | Jassby et al. | 376/107 |
| 4,065,351 | 12/1977 | Jassby et al. | 376/107 |
| 4,548,782 | 10/1985 | Mannheimer et al. | 376/130 |
| 4,650,631 | 3/1987 | Knorr | 376/107 |

OTHER PUBLICATIONS

Linlor, William I., "Plasma-Target Fusion Machine," Hughes Aircraft Company, Research Report 128, Oct. 1959.
Bell, P. R. et al., "Oak Ridge Multiple-Pass Injection Experiment, DCX-2," Plasma Physics and Controlled Nuclear Fusion Research, vol. II, Conference Proceedings, Culham, Sep. 6-10, 1965, International Atomic Energy Agency, Vienna, 1966, pp. 77-91.
Dawson, J. M. et al., "Stellarator-Mirror Machine Target Plasma Reactor," Plasma Physics Laboratory, MATT-841, May 1971.
Dawson, J. M. et al., "Production of Thermonuclear Power by Non-Maxwellian Ions in a Closed Magnetic Field Configuration," Physical Review Letters, vol. 26, No. 19, May 10, 1971, pp. 1156-1160.
Post, R. F. et al., "Concept for a High-Power-Density Mirror Fusion Reactor,", Physical Review Letters, vol. 31, No. 5, Jul. 30, 1973, pp. 280-282.

(List continued on next page.)

Primary Examiner—Harvey E. Behrend
Attorney, Agent, or Firm—Fitch, Even, Tabin & Flannery

[57] ABSTRACT

A fusion device provides for the reaction of atomic nuclei, preferably deuterons and tritons, to generate reaction products with kinetic energies convertible to useful energy. First and second sources of first and second positive ions provide such ions at temperatures in a range where the ions have a substantially optimum cross section for mutual reaction. The respective ions are accelerated to substantially the same mean velocity and formed into respective beams. The beams are neutralized and directed into a portion of a reaction chamber substantially orthogonally of a substantially constant unidirectional magnetic field as first and second polarized beams of respective first and second positive hot ions. The polarization of the first and second polarized beams is drained, preferably by a plasma created in the portion of the reaction chamber, to separate the neutralizing electrons from the respective first and second positive hot ions. The strength of the magnetic field and the velocities of the separated first and second positive hot ions provide centripetal force on the respective first and second positive hot ions to confine the ions to respective orbits within the portion of the reaction chamber. The directions and relative velocities of the separated first and second positive hot ions make the respective orbits for the first and second positive hot ions substantially coextensive. The ions orbit in the same direction at substantially the same mean velocity. The first and second ions are preferably deuterons and tritons, respectively, having a temperature of about 50 keV. The deuterons are preferably accelerated to about 400 keV, and the tritons are accelerated to about 600 keV. The ions have substantially drifted Maxwell distributions of energy.

25 Claims, 2 Drawing Sheets

OTHER PUBLICATIONS

Phelps, D. A. et al., "Observations of the Stable Equilibrium and Classical Diffusion of Field Reversing Relativistic Electron Coils," The Physics of Fluids, vol. 17, No. 12, Dec. 1974, pp. 2226–2235.

Fleischmann, H. H. et al., "High-Energy Electron and Ion Rings for Plasma Confinement," Electrostatic and Electromagnetic Confinement of Plasmas and the Phenomenology of Relativistic Electron Beams, New York Academy of Sciences, ANYAA9 251, 1–711 (1975), pp. 472–480.

Jassby, D. L., "Reactor Aspects of Counterstreaming-Ion Tokamak Plasmas," Nuclear Fusion, vol. 16, 1976, pp. 15–29.

Jassby, D. L., "Neutral-Beam-Driven Tokamak Fusion Reactors," Nuclear Fusion 17 2 (1977), pp. 309–365.

Maglich, Bogdan C., "Migmacell-A Low Gain 'Driven' Fusion Power Amplifier as an Interim Energy Source," Nuclear Instruments and Methods 151 (1978), pp. 1–27.

Roberson, C. W. et al., "Magnetic Field Reversal Induced by an Intense Rotation Electron Beam in an Initially Neutral Gas," Applied Physics Letters, vol. 32, No. 4, Feb. 15, 1978, pp. 214–216.

Robertson, S. et al., "Propagation of an Intense Ion Beam Transverse to a Magnetic Field," Physical Review Letters, vol. 47, No. 7, Aug. 17, 1981, pp. 508–511.

Finn, J. M. et al., "Field-Reversed Configuration with a Component of Energetic Particles," Nuclear Fusion, vol. 22, No. 11 (1982), pp. 1443–1518.

Peter, William et al., "Theory of Plasma Injection Into a Magnetic Field," Phys. Fluids 25(4), Apr. 1982, pp. 730–735.

Wickham, Michael, "Cross Field Injection and Trapping of a Continuous Plasma Beam in a Magnetic Mirror," Plasma Physics, vol. 25, No. 1, 1983, pp. 103–111.

Miller, Paul A., "Overview of Ion Diode Research," Beams '83, Fifth International Conference on High-Power Particle Beams, Sep. 12–14, 1983, pp. 129–134.

Takahashi, T. et al., "An Intense Pulsed Ion Source with a Cryogenically Refrigerated Anode Cooled by Liquid Helium," Beams '83, Fifth International Conference on High-Power Particle Beams, Sep. 12–14, 1983, pp. 171–174.

Katzenstein, J., "Injection and Trapping of an Intense Energetic Ion Beam in a Tokamak," Beams '83, Fifth International Conference on High-Power Particle Beams, Sep. 1983.

Mohri, A., "Intense Relativistic Electron Beam Ring (SPAC)," Nuclear Fusion, vol. 25, No. 9 (1985), pp. 1299–1300.

Blaugrund, A. E. et al., "A Stretched Betatron," J. Appl. Phys. 57(7), Apr. 1, 1985, pp. 2474–2476.

Ishizuka, H. et al., "Beam Acceleration in the UCI Stellatron", Beams '86, Proceedings of the 6th International Conference on High-Power Particle Beams, Jun. 9–12, 1986, pp. 722–725.

Rostoker, Norman and Amnon Fisher, "Modified Betatron for Ion Beam Fusion," Beams '86, Proceedings of the 6th International Conference on High-Power Particle Beams, Jun. 9–12, 1986.

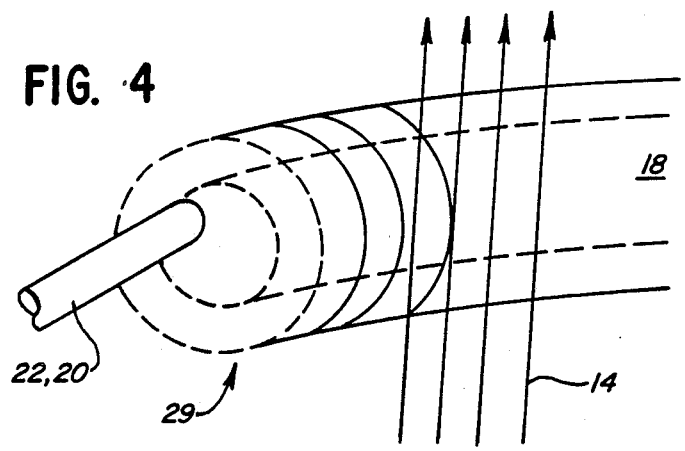
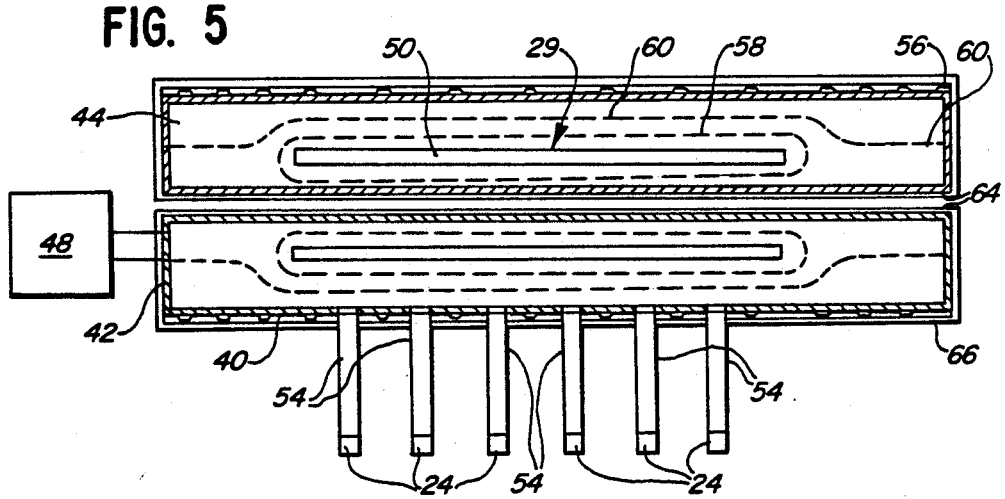
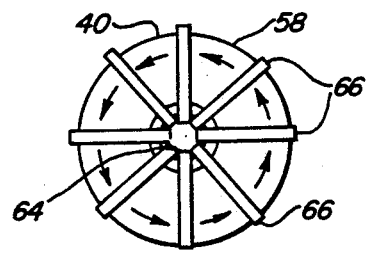

4,894,199

BEAM FUSION DEVICE AND METHOD

This application is a continuation-in-part of copending U.S. application Ser. No. 872,888, filed June 11, 1986, now abandoned.

BACKGROUND OF THE INVENTION

This invention pertains generally to fusion devices and methods and is more particularly directed to such devices and methods wherein high energy beams of positive hot ions are injected into a confining magnetic field wherein the ion beams are trapped in orbits where the ions react to release energy in spontaneous fusion reactions.

There are many fusion devices based on various confinement configurations and confinement principles wherein plasma is generated in a reaction chamber and confined magnetically. The plasma is heated by such methods as ohmic heating, r.f. heating and neutral beam heating to temperatures where the nuclei in the plasma react to release energy. Deuterium and tritium nuclei, that is deuterons and tritons, are the common reactants, for upon fusion they produce an alpha particle and a neutron and more than 17 MeV in energy, about 14 MeV in the form of the kinetic energy of the neutron and the rest in the form of the kinetic energy of the alpha particle. This energy is commonly captured in a blanket and converted to heat used to generate useful electricity. A major problem with such devices lies in confining the plasma long enough for enough reactions to occur to justify the energy needed to operate the devices, of which operation of the confining magnetic fields is a large part. Among such devices are those of toroidal geometry, such as tokamaks, and those of linear geometry, such as mirror machines.

In tokamaks the plasma is confined in a toroidal chamber primarily by the combination of toroidal and poloidal fields. In general, the toroidal field directs the plasma around the torus, and the poloidal field keeps the plasma together. The plasma ions follow the magnetic field lines around the torus, orbiting the respective toroidal field lines at radii small compared to the dimensions of the chamber. The magnetic field lines have a rotational transform $$\frac{\gamma}{2\pi} = \frac{RB_p}{rB_t} \quad (1)$$

Where r is the minor radius of the plasma, R is the major radius; $B_t$ is the toroidal magnetic field and $B_p$ is the poloidal magnetic field. The Kruskal-Shafranov condition is that $\gamma < 2\pi$. When $\gamma = 2\pi$, there is no rotational transform of the magnetic field to compensate the toroidal drift of the particles or ions.

Alternatively, tokamak instabilities are associated with $k.B = (n/R)B_t \pm (m/r)B_p = 0$, where n and m are integers. This condition means that particles or ions following the field lines remain in resonance with the perturbation characterized by the integers m and n. The quantity $q = 2\pi/\gamma$ is known as the safety factor, and an essential restriction for toroidal confinement is $q > 1$. This means that the toroidal field $$B_t = B_p \frac{R}{r} q \quad (2)$$

must be very large. For example, with a safety factor $q = 4$, the magnetic pressure $B_p^2/8\pi$ equal to the particle pressure nT (that is, $B_p^2/8\pi = nT$), ion density $n = 2 \times 10^{14} cm^{-3}$, and ion temperature $T = 50$ keV, $B_p = 20$ kG. To keep the toroidal field $B_t$ below 100 kG, R/r must be near unity. The inescapable result of this is that in tokamaks an enormous energy investment in the toroidal field energy must be made which serves no useful purpose except that it is necessary for stability. The requirement that $q > 1$ is the principal reason for poor economics of the tokamak geometry fusion reactor. Therefore, it would be extremely advantageous to provide a magnetic containment configuration which does not require the extremely large toroidal field of the tokamak.

There have been devices for producing fusion reactions by bombarding a target plasma with energetic ion beams. This is usually in the context of a dense background plasma with hot electrons and cold ions. Because of the cold plasma ions, the beam ions slow down rapidly, and the maximum gain of fusion energy/beam ion energy for the device is limited to 3–4. Such a device is shown in Dawson, J. M., H. P. Furth and F. H. Tenney, "Stellarator-Mirror Machine Target Plasma Reactor," Plasma Physics Laboratory, Princeton University, Princeton, N.J., MATT-841, May 1971.

Another device wherein an ion beam is directed against a plasma is shown in Manheimer et al., U.S. Pat. No. 4,548,782, wherein an ion accelerator produces a neutral beam used to heat a magnetically confined plasma in a tokamak. In one disclosed embodiment the plasma is at low density when the beam is injected, and the remaining plasma is built up around it thereafter. Confinement is according to tokamak principles, and the plasma is heated to ignition.

SUMMARY OF THE INVENTION

The present invention is directed to a fusion device utilizing two beams of positive hot ions moving with substantially the same mean velocity, without a target plasma. First and second positive hot ions, preferably deuterons and tritons, respectively, are accelerated to high energies and to substantially the same mean velocity and are formed into respective beams. The beams are neutralized and directed into a substantially constant unidirectional magnetic field in a reaction chamber. The beams are introduced perpendicular to the direction of the magnetic field and acquire an electric self-polarization due to the magnetic field. The polarization is thereafter drained due to electron conductivity along the magnetic field lines when the beams reach the interior of the device so that the beams are trapped in the magnetic field. That is, the drained beams are trapped to move in circular orbits, as in a betatron. The orbiting ions produce a poloidal magnetic field with field reversal. The velocities of the ions and the intensity of the magnetic field cause the ions to remain in orbit within the chamber. The ions are initially generated at temperatures in the range where there is a substantially optimum cross section for their mutual reaction, e.g., 50 keV. Because they are moving in the same direction at high velocity and initially have drifted Maxwell distributions, collisions therebetween as the beams orbit do not change the distribution or the mean velocity, and the ions remain hot and confined for relatively long periods, permitting the desired reactions to occur before the ions are lost from the beams or their temperatures drop below a useful temperature.

In the present invention a low density, cool plasma is introduced into the reaction chamber for the sole purpose of draining the polarization of the polarized ion beams. This is needed only at the start of injection of the ion beams, for thereafter the electrons associated with the trapped beams themselves drain the later entering portions of the beams. Preferably, the two beams are beams of deuterons and tritons, respectively, moving at substantially the same velocity and generated at a temperature of about 50 keV. Preferred energies are 400 keV for the deuteron beam and 600 keV for the triton beam.

Prior reactor configurations involving beams of energetic particles and conventional high density, low energy target plasma have had their theoretical energy gain limited to about 3–4 because the energetic particles lost energy to the plasma too rapidly and spent too little time at an energy level where the fusion cross section was high. Because of the high energy positive hot ion beams used in the present invention, the deuteron beam reacts spontaneously with the triton beam to produce a fusion reaction. The ion distributions of the beams are drifted Maxwell distributions which do not change because of collisions. The relative energy due to the beam temperature is all that is critical for the fusion reaction, and this parameter can be selected to give a large reaction rate by operating at the temperature providing the optimum cross section for mutual reaction. Thus, the possible energy gain can be as high as approximately 20.

Because the gain can be made sufficiently large, continuous ignition of the plasma is not required. This makes it possible to have a small reactor (with characteristic dimensions less than the gyro-radius of a 3.5 MeV He ion) and to operate in a continuous manner.

Another advantage of the invention is that the ions are brought to an appropriate energy level and density outside the magnetic containment device by the injection means. It is practically impossible to build up either the density or the energy of a plasma within a magnetic trap without passing through many instabilities. Therefore, one must pass through them rapidly or the instabilities will hinder the process. The present method accomplishes this by generating the ions at high density and energy levels outside the magnetic trap. The methods of injection and trapping of the ions described below insure that the instabilities are passed through rapidly. Thus, an operational point for the reactor may be found between such instabilities.

The ion beams are generated at high densities and energies and then neutralized by picking up electrons to produce intense neutralized beams. The fully neutralized beams propagate across the magnetic fields of the containment geometry by means of self-polarization and ExB drift. When the polarized beams reach plasma, the polarization of the electrons is drained rapidly because the plasma is a good conductor. Thereafter, the beam ions move in a manner determined by the prevailing magnetic fields of the containment device. This produces a trapping of the beams within the containment area.

The confining field is a substantially constant unidirectional magnetic field directed normal to the ion beams, thus eliminating the need of a large toroidal magnetic field for stability. This is because under the influence of the field large orbit encircling particles do not follow field lines. Thus, the Kruskal-Shafranov limit is not applicable, and it is not necessary for stability to generate the large toroidal magnetic field used in tokamaks. The energy investment in this magnetic field is no longer necessary. The field is azimuthally symmetrical. It is unidirectional over the trapping region and preferably converges outside this region to keep the orbits in the region.

These and other aspects, objects and features of the invention will become apparent in the following detailed description, particularly when taken in conjunction with the accompanying drawings.

BRIEF DESCRIPTION OF THE DRAWINGS

FIG. 4 is a diagrammatic illustration of the injection and trapping of a neutralized and polarized ion beam in a magnetic field, illustrating the draining of the polarization;

FIG. 5 is an axial cross sectional view of a fusion device in accordance with the teachings of the invention; and FIG. 6 is an end view of the device illustrated in FIG. 5.

DETAILED DESCRIPTION OF THE PREFERRED EMBODIMENT

High energy deuterium and tritium ion beams of a pulsed nature can be efficiently generated with ion diodes and Marx generators. A neutralized ion beam has an equal number of comoving positive ions and electrons. The resultant beam is electrically neutral and has no net current or charge. In the preferred embodiment of the present invention about ions are accelerated to 400 or 600 keV in single pulses of 100 nsec utilizing such generators. The particle beam density is approximately $10^{14}$ cm$^{-3}$. An ion diode is used for generating positive hot deuterium and tritium ions, and the beam is neutralized by picking up electrons just outside of the cathode of the diode.

Figure 1:
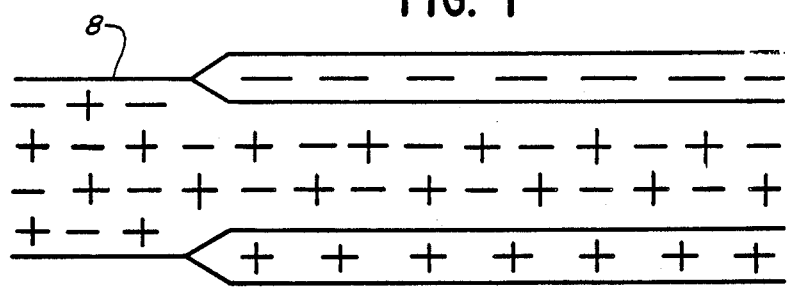
FIG. 1 is a diagrammatic illustration of a neutralized and polarized ion beam.

The polarization of a neutralized ion beam is illustrated in FIG. 1, where there are equal numbers of positive and negative charges. The positive charges represent the high energy and high density ions of a nuclear reactant, and the negative charges represent neutralizing electrons. This neutralized beam is transported across the magnetic containment field without deflection according to the well known polarization effect described in the aforesaid U.S. Pat. No. 4,548,782. The magnetic field acts on the oppositely charged particles in opposite directions, but the resulting space charges attract, leaving the neutralized beam intact but polarized.

FIG. 1 shows the polarization into positive ions (+) and electrons (−) of a neutralized ion beam 8 such that it may be injected across a magnetic field into the confinement area 29 by means of the polarization effect. The neutralized beam will then be trapped in the confinement area 29 if it contains plasma. As described in U.S. Pat. No. 4,548,782, the plasma drains the polarization because it is a good conductor. After draining of the polarization, the motion of the beam ions is determined by the magnetic fields of the confinement area 29.

Figure 2:
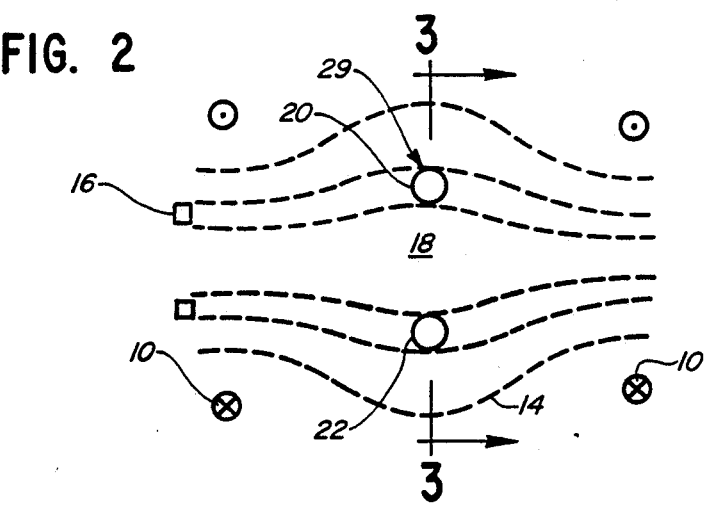
FIG. 2 is a diagrammatic illustration of the injection and trapping of a neutralized ion beam in a magnetic field.
Figure 3:
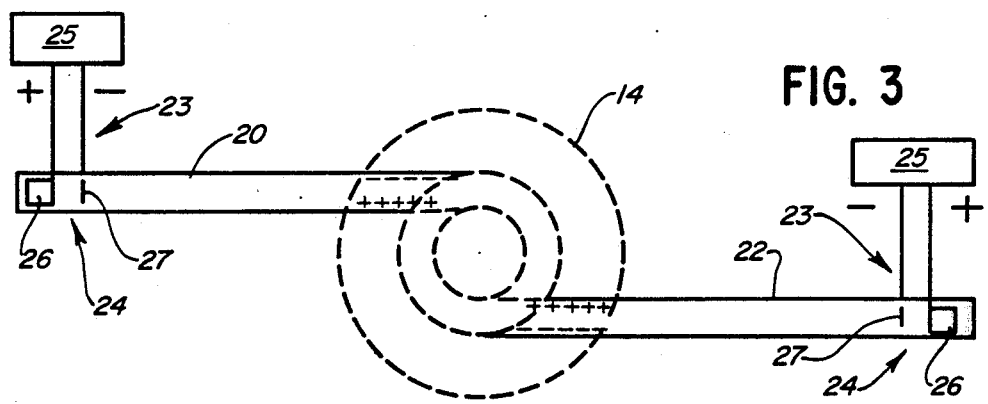
FIG. 3 is a transaxial view of the system illustrated in FIG. 2, taken along section lines 3—3 in FIG. 2.

FIG. 2 and FIG. 3 show injection and trapping in a reaction chamber. Coils 10 generate a substantially constant axial magnetic field 14 converging at the ends of the confinement area 29. The confinement area 29 is supplied with cool, low density plasma 18. The device includes a conducting end plate 16 for draining the electrons in draining the polarization of the beams. Electrons follow the field lines to the plate 16. As illustrated in FIG. 3, neutralized and polarized ion beams 20 and 22 can be injected through the field lines 14 into the plasma 18, where the polarization is drained by the action of the plasma, and the ions are trapped in the confinement area 29 by the magnetic field 14.

The beams 20 and 22 are each generated by a respective ion accelerator 23 comprised of an ion diode 24 and a Marx generator 25. The ion diode 24 comprises an ion source anode 26 and a cathode 27. The ion source anode 26 generates ions of a respective reactant, e.g., deuterons or tritons, at an appropriate temperature, e.g. 50 keV. The Marx generator 25 produces pulse of accelerating voltage of appropriate magnitude, e.g., 400 V for accelerating deuterons and 600 V for accelerating tritons. The ions are thereupon accelerated toward the cathode 27, which is made relatively transparent to the accelerated ion and which furnishes a source of electrons. The electrons neutralize the beam of accelerated ions to produce a neutralized beam of ions 20, 22. The respective beams are directed into the confinement area 29 substantially normal to the field lines 14. The beams are polarized for entry into the field and are then drained to trap the ions, as will be described in connection with FIG. 4.

FIG. 4 shows injection and trapping of neutralized ion beams, particularly the draining of the polarization. The neutralized and polarized ion beams 20, 22 are injected into the confinement area 29. The magnetic confinement area 29 contains the plasma 18 which, being conductive, drains the polarization of the beam. Once the polarizing electrons have been drained, the field lines 14 will confine the charged particles according to the forces developed by the magnetic confining field, as in a betatron.

The high density, energetic ions of the deuterium and tritium beams are introduced at substantially the same velocity and confined to move together in the same direction, whereupon there is a spontaneous fusion reaction without ignition because the ions are at a temperature at which the reaction cross section is suitable. On the other hand, in the case of tokamaks, it is necessary to contain the resulting 3.5 MeV α-particles to preserve their energy in the system for ignition. In order to contain 3.5 MeV α-particles, the minor radius of a tokamak must be at least 10 times the gyro-radius of the α-particles, which is 10.7 cm in a magnetic field of 50 kG. For this and other reasons, a tokamak reactor with ignition must be very large.

It is possible with the present invention to produce net energy without achieving ignition. The high energy ion beams are injected, trapped and confined as described above so that scattering, which is always more frequent than fusion, will not quickly lead to the loss of the high energy ions or the energy investment in the beam.

In respect to tokamaks known in the art, an energetic ion beam trapped in a tokamak plasma will slow down according to the formula $$\frac{dW}{dt} = \frac{-4\pi e^4 \ln Z}{V} \left[ \frac{n_i}{M_i} + \frac{4}{3\sqrt{\pi}} \frac{n_e}{M_B} (m/M_B)^{1/2} \left(\frac{W}{T_e}\right)^{3/2} \right] \quad (3)$$

where W is the energy of beam ions of mass $M_B$ and velocity V; $n_i$ is the density of plasma ions of mass $M_i$; $n_e$ is the density of electrons of mass m and temperature $T_e$. The quantity ln Z is about 20.

The first term of Equation (3) is due to scattering of beam ions by plasma ions. It is based on the assumption that $V > v_i$, the ion thermal velocity defined by $M_i v_i^2 = T_i$, the ion temperature. Since this first term is independent of $T_i$, it obtains even for $T_i = 0$. The second term is due to scattering of beam ions by plasma electrons. It has been assumed that $V < v_e$, where $v_e$ is the electron thermal velocity and $m v_e^2 = T_e$.

Fusion takes place according to the formula $$(dn_d/dt) = -n_t n_d < v \sigma_{dt}(v) > \quad (4)$$

If it be assumed that the beam is deuterium and the plasma ions are tritium, $n_i = n_t$ and the density of beam ions $n_B = n_d$, v is the relative velocity of deuterium and tritium ions; the brackets indicate an average over the ion distributions; and $\sigma_{dt}$ is the reaction cross section. The energy gain is defined as $$F = f W_F / W_o \quad (5)$$

where $W_F = 22.4$ Mev is the fusion energy per reaction, counting energy collected from secondary reactions in the blanket. W is the initial beam ion energy and f is the fusion probability which can be determined from Equations (3) and (4).

A previous study of energy multiplication indicated that to obtain $F > 1$ required $T_e > 4$ keV. For $T_e < 4$ keV, the beam ions slow down in the plasma so fast that little time is spent at energies where $\sigma d_t$ is significant. F increases when $T_e$ is increased because the slowing down due to electrons decreases as $T_e^{-3/2}$. Even if $T_e$ were infinite, the slowing down due to cold ions would be sufficient to limit F to to $F \leq 4$. Thus, although it is possible to produce fusion energy without ignition, which makes a small reactor feasible since the α-particles need not be contained, the energy gain is insufficient in tokamaks to make the reactor economically attractive.

To reduce the effect of the ion drag present in tokamaks, the present invention uses a configuration wherein the beams of deuterium and tritium ions have substantially the same velocity at energies of about 400 keV and about 600 keV, respectively, orbiting in the same direction. The energy distributions are described by drifted Maxwell distributions $$f_j(v) = n_j \left(\frac{m_j}{2\pi T}\right)^{3/2} \exp -\frac{m_j}{2T}(v - V)^2 \ldots \quad (6)$$

where j = d,t, $V = 0.625 \times 10^9$ cm/sec and T = 50 keV, for example. To create these distributions, intense neutralized ion beams are injected and trapped as previously described. This requires a background plasma to drain the polarization. However, only the conduction properties matter, and the density need not be large; for example, a density of about $10^{12} cm^{-3}$ is sufficient.

The slowing down of the ion beams by the cold plasma ions can be neglected because of the low density of the plasma and because the plasma ions soon escape confinement. The electrons that accompany the beams will be stopped by the magnetic field when the transverse polarization is drained. There is an induced electric field according to Lenz's law to oppose the change in current, and the induced current may be in the background plasma or the conducting boundary. Thus, the electron distribution is difficult to anticipate but is dependent upon the configuration. The ion beams have a temperature of 50 keV produced by the ion diode 24. The electrons most likely will have a similar temperature. If less, they will be heated by the beams after trapping. For slowing down, the ions have an energy of about 400-600 keV; for fusion, which depends only on the relative velocity of the deuterium and tritium ions, the temperature would be 50 keV for the energies of the ions in the moving reference frame. Therefore, the slowing down time is much greater than in the usual dense target configuration of tokamaks, thereby increasing the gain. If it can be made larger than the fusion time $T_F = [n < \sigma v >]^{-1} = 11.8$ sec, the maximum possible gain would be 22.4.

A preferred configuration for a fusion device is shown in FIGS. 5 and 6. Container walls 40, 42 define and confine a reaction chamber 44, generally cylindrical in shape. A field coil 56 produces a relatively constant field with field lines 60 extending axially along the longitudinal axis of the chamber. The field is azimuhally symmetrical and axial over the confinement region 29. The coil 56 produces a stronger field with more windings at the ends than in the middle to provide a closing effect at the ends of the annular confinement area 29. Toroidal field coils 66 including central conductors 64 produce a modest toroidal magnetic field for controlling precessional mode instability. Because the toroidal field is not needed for primary confinement, it is not necessary for it to be as strong as in a normal tokamak configuration. An ion layer 50 can be built up and maintained by injecting repetitive pulses of deuterons and tritons from a series of ion diodes 24 firing through respective ion injection channels 54. At start-up a plasma gun 48 introduces a plasma 18 of cool, low density ions into the reaction chamber 44 to provide for draining of the polarization of the beams. The energization of the plasma gun 48 and the ion diodes 24 may be synchronized by timing means (not shown). The plasma gun may be, for example, a well known titanium hydride discharge device emitting a beam of protons along the field lines 60.

Preferably ion energies of 400 keV for deuterium and 600 keV for tritium ions are used so that both species have a mean velocity of $0.625 \times 10^9$ cm/sec. The containment area for the ion layer is annular in shape and is preferably about 1 m long with an internal radius 22 cm and external radius 27 cm; the volume is $0.77 \times 10^5 cm^3$ and the ion density is $2 \times 10^{14}$ cm$^{-3}$ so that the total number of ions is $1.5 \times 10^{19}$. With six injectors 52, each emitting $10^{17}$ ions every 0.5 sec, the ion layer can be replaced in 12 sec., which is about the fusion time. The average ion beam power is 0.1 Mw and the fusion power is $$p = <\sigma V> n_d n_t \times [22.4 \; MeV/\text{reaction}] = 2.24 \; \text{Mw}.$$

The trapping of the neutral ion beams is as discussed in respect to FIG. 4. The positive and negative charges of the beam polarization are connected by a magnetic field line, which is a long path along which charge can move freely to drain the polarization.

The mean applied field which is generated axially by the field coil 56 would be 5 kG so that the gyro-radius in this field about the annular confinement area 29 is 25.2 cm for deuterium ions and 37.8 cm for tritium ions. The magnetic field is substantially altered by this toroidal current from the beam. Such circulating current produces closed poloidal field lines 58 that are necessary to confine the beam pressure. The poloidal field acts to keep the two beams orbiting substantially coextensively, permitting the reactions to proceed easily. If $n = 2 \times 10^{14}$ cm$^{-3}$ and T=50 keV, from the relation of particle pressure equal to magnetic pressure, $nT = B_p^2/8\pi$, the poloidal magnetic field must be 20 kG. This means a field reversal factor of 4 is required in order to realize $B_p = 20$ kG. Assuming a uniform current density between $r = 22$ cm and $r = 27$ cm, a circular orbit for deuterium ions would be found at 25.2 cm and a circular orbit for tritium ions at 25.5 cm. The magnetic field changes rapidly during reversal so that the momentum difference between deuterium and tritium ions does not lead to a large change in the location of the respective orbits. Most of the orbits of individual ions oscillate about the average circular orbit radius, because the beams have a temperature of 50 keV. The poloidal magnetic field is $B_p \sim (2\pi/c)$ nev $\Delta r$ if only ions carry current. In that case $B_p = 62.8$ kG.

As previously discussed, the current due to the electrons of the beams cancels the ion current before trapping. After trapping, the invention provides different means to control the plasma net current such that $B_p = 20$ kG. Various diamagnetic effects adjust either the toroidal or poloidal fields to obtain an equilibrium. The current will also change as reactions take place, or due to electron-ion interactions. The continuous injection of ions by the beams can maintain the current at an acceptable value such that an equilibrium current can be established.

While a preferred embodiment of the invention has been illustrated, it will be obvious to those skilled in the art that various modifications and changes may be made thereto without departing from the spirit and scope of the invention as defined in the appended claims.

What is claimed is:

1. A fusion device wherein atomic nuclei react to generate reaction products with kinetic energies convertible to useful energy, said device comprising wall means defining and confining a reaction chamber, means for generating a substantially constant unidirectional magnetic field of predetermined strength in at least a portion of said reaction chamber, first and second source means for providing respective first and second positive hot ions at temperatures in a range where said first and second positive hot ions have substantially optimum cross sections for their mutual fusion reaction to generate said reaction products, first and second means for accelerating said first and second positive hot ions, respectively, to predetermined velocities, means for neutralizing said accelerated positive hot first and second positive ions by electrons, means for directing said first and second positive hot ions neutralized by electrons into said portion of said reaction chamber substantially orthogonally of said magnetic field utilizing self-polarization, and means for draining the polarization of said neutralized and polarized first and second positive hot ions to separate the neutralizing electrons from the respective first and second positive hot ions, the predetermined strength of the magnetic field and the predetermined velocities to which said first and second positive hot ions are accelerated being such as to provide centripetal force on the respective separated first and second positive hot ions to confine the ions to respective orbits within said portion of said reaction chamber, and the directions and relative ions being such as to make the respective said orbits for said first and second positive hot ions substantially coextensive, with the first and second positive hot ions moving in substantially the same direction at substantially the same mean velocity.

2. A fusion device wherein atomic nuclei react to generate reaction products with kinetic energies convertible to useful energy, said device comprising wall means defining and confining a reaction chamber, means for generating a substantially constant unidirectional magnetic field of predetermined strength in at least a portion of said reaction chamber, first and second means for directing respective first and second neutralized beams of respective first and second positive hot ions neutralized by electrons into said portion of said reaction chamber at substantially the same predetermined mean velocity substantially orthogonally of said magnetic field as first and second polarized beams of respective first and second positive hot ions, the first and second positive hot ions in said respective first and second neutralized beams being provided at temperatures in a range where said first and second positive hot ions have substantially optimum cross sections for their mutual fusion reaction to generate said reaction products, and means for draining the polarization of said first and second polarized beams to separate the neutralizing electrons from the respective first and second positive hot ions, the predetermined strength of the magnetic field and the predetermined velocities of the separated first and second positive hot ions being such as to provide centripetal force on the respective separated first and second positive hot ions to confine the ions to respective orbits within said portion of said reaction chamber, the directions and relative velocities of said separated first and second positive hot ions being such as to make the respective said orbits for said first and second positive hot ions substantially coextensive, with the first and second positive hot ions moving in substantially the same direction at substantially the same mean velocity.

3. A fusion device according to claim 2 wherein said first means for directing comprises first source means for providing first positive hot ions at a said temperature, first beam generating means for accelerating said first positive hot ions to substantially said predetermined mean velocity and forming said first positive hot ions into a first ion beam, and first neutralizing means for neutralizing said first positive hot ions in said first ion beam by adding electrons thereto to produce a first neutralized beam of said first positive hot ions at substantially said predetermined mean velocity; and said second means for directing comprises second source means for providing second positive hot ions at a said temperature, second beam generating means for accelerating said second positive hot ions to substantially said predetermined mean velocity and forming said second positive hot ions into a second ion beam, and second neutralizing means for neutralizing said second positive hot ions in said second ion beam by adding electrons thereto to produce a second neutralized beam of said second positive hot ions at substantially said predetermined mean velocity.

4. A fusion device according to any one of claims 1 to 3 wherein said means for draining comprises means for creating plasma within said portion of said reaction chamber.

5. A fusion device according to claim 4 wherein said means for creating plasma comprises a plasma gun.

6. A fusion device according to any one of claims 1 to 3 further comprising means for limiting said orbits in the direction of said magnetic field.

7. A fusion device according to claim 6 wherein said means for limiting said orbits comprises means for increasing the intensity of said magnetic field outside said portion of said reaction chamber in the axial direction.

8. A fusion device according to claim 7 wherein said means for limiting includes magnetic mirrors.

9. A fusion device according to either one of claims 1 and 3 wherein said source means provide respective first and second positive hot ions of substantially drifted Maxwell distribution.

10. A fusion device according to any one of claims 1 to 3 wherein said first positive hot ions are deuterons, said second positive hot ions are tritons, and said temperatures are about 50 keV.

11. A fusion device according to claim 10 where said first beam generating means accelerates said deuterons to about 400 keV, and said second beam generating means accelerates said tritons to about 600 keV.

12. A fusion device according to either one of claims 1 and 3 wherein said first and second means for accelerating are pulsed.

13. A fusion device according to any one of claims 1 to 3 wherein said means for generating said magnetic field generates a field azimuthally symmetrical in said portion of said reaction chamber.

14. A method for causing atomic nuclei to react to generate reaction products with kinetic energies convertible to useful energy, said method comprising generating a substantially constant unidirectional magnetic field of predetermined strength in at least a portion of a reaction chamber, providing first and second positive hot ions at temperatures in a range where said first and second positive ions have substantially optimum cross sections for their mutual fusion reaction to generate said reaction products, accelerating said first and second positive hot ions to predetermined velocities, neutralizing said accelerated first and second positive hot ions by electrons, directing said first and second positive hot ions neutralized by electrons into said portion of said reaction chamber substantially orthogonally of said magnetic field utilizing self-polarization, and draining the polarization of said neutralized and polarized first and second positive hot ions to separate the neutralizing electrons from the respective first and second positive hot ions in said portion of said reaction chamber, the predetermined strength of the magnetic field and the predetermined velocities to which said first and second positive hot ions are accelerated being such as to provide centripetal force on the respective separated first and second positive hot ions to confine the ions to respective orbits within said portion of said reaction chamber, and the directions and relative velocities of said separated first and second positive hot ions being such as to make the respective said orbits for said first and second positive hot ions substantially coextensive, with the first and second positive hot ions moving in substantially the same direction at substantially the same mean velocity.

15. A method for causing atomic nuclei to react to generate reaction products with kinetic energies convertible to useful energy, said method comprising generating a substantially constant unidirectional magnetic field of predetermined strength in at least a portion of a reaction chamber, directing first and second neutralized beams of respective first and second positive hot ions neutralized by electrons into said portion of said reaction chamber at substantially the same predetermined mean velocity substantially orthogonally of said magnetic field as first and second polarized beams of respective first and second positive hot ions, the first and second positive hot ions in said respective first and second neutralized beams having temperatures in a range where said first and second positive hot ions have substantially optimum cross sections for their mutual fusion reaction to generate said reaction products, draining the polarization of said first and second polarized beams to separate the neutralizing electrons from the respective first and second positive hot ions in said portion of said reaction chamber, the predetermined strength of the magnetic field and the predetermined velocities of the separated first and second positive hot ions being such as to provide centripetal force on the respective separated first and second positive hot ions to confine the ions to respective orbits within said portion of said reaction chamber, and the directions and relative velocities of said separated first and second positive hot ions being such as to make the respective said orbits for said first and second positive hot ions substantially coextensive with the first and second positive hot ions moving in substantially the same direction at substantially the same mean velocity.

16. A method according to claim 15 wherein said step of directing said first and second neutralized beams comprises generating said first and second positive hot ions at substantially said temperatures, separately accelerating said generated first and second positive hot ions to substantially said predetermined mean velocity to produce said first and second neutralized beams.

17. A method according to any one of claims 14 to 16 wherein said polarization is drained by creating plasma in said portion of said reaction chamber.

18. A method according to either one of claims 14 and 16 further comprising limiting said orbits in the direction of said magnetic field.

19. A method according to claim 18 wherein said orbits are limited by the convergence of the field lines of said magnetic field outside said portion of said reaction chamber.

20. A method according to any one of claims 14 to 16 wherein said first and second positive hot ions are generated with substantially drifted Maxwell distribution.

21. A method according to any one of claims 14 to 16 wherein said first positive hot ions are deuterons, said second positive hot ions are tritons, and said temperatures are about 50 keV.

22. A method according to claim 21 wherein said deuterons are accelerated to about 400 keV, and said tritons are accelerated to about 600 keV.

23. A method according to any one of claims 14 to 16 wherein said first and second beams of positive hot ions are generated in pulses.

24. A method according to any one of claims 14 to 16 wherein said magnetic field is azimuthally symmetrical in said portion of said reaction chamber.

25. A method according to any one of claims 14 to 16 wherein said orbiting first and second positive hot ions create poloidal fields around said orbiting ions for keeping said orbits substantially coextensive.

* * * * *

UNITED STATES PATENT AND TRADEMARK OFFICE
CERTIFICATE OF CORRECTION

PATENT NO. : 4,894,199

DATED : January 16, 1990

INVENTOR(S) : Norman Rostoker

It is certified that error appears in the above-identified patent and that said Letters Patent is hereby corrected as shown below:

Other Publications, page 2, column 2, lines 8, 12 and 16, change "Beams" to --BEAMS--.

Column 1, line 58, change "k.B" to --k·B--.

Column 4, line 38, after "about" insert --$10^{18}$--.

Column 5, line 19, after "e.g.", insert a comma.

Column 6, line 36, change "Mev" to --MeV--;

line 38, change "W" to --$W_o$--;

line 44, change "$\sigma d_t$" to --$\sigma_{dt}$--;

line 48, delete "to" (third occurrence);

line 63, change "$(v-V)^2$" to --$(v-V)^2$--.

Column 7, line 34, change "azimuhally" to --azimuthally--.

Column 9, line 21, after "relative", insert --velocities of said separated first and second positive hot--.

UNITED STATES PATENT AND TRADEMARK OFFICE
CERTIFICATE OF CORRECTION

PATENT NO. : 4,894,199

DATED : January 16, 1990

INVENTOR(S) : Norman Rostoker

It is certified that error appears in the above-identified patent and that said Letters Patent is hereby corrected as shown below:

Column 10, line 45, change "where" to --wherein--.

Signed and Sealed this

Sixteenth Day of April, 1991

Attest:

HARRY F. MANBECK, JR.

*Attesting Officer*  *Commissioner of Patents and Trademarks*